United States Patent [19]

Pira et al.

[11] 4,365,116

[45] Dec. 21, 1982

[54] DIGITAL RINGING-SIGNAL GENERATOR

[75] Inventors: Franco Pira; Giovanni Ponte, both of Turin, Italy

[73] Assignee: Cselt - Centro Studi e Laboratori Telecomunicazioni S.P.A., Turin, Italy

[21] Appl. No.: 229,174

[22] Filed: Jan. 28, 1981

[30] Foreign Application Priority Data

Jan. 29, 1980 [IT] Italy .................................. 67119 A/80

[51] Int. Cl.³ .................................................. H04M 1/26
[52] U.S. Cl. ..................................................... 179/84 T
[58] Field of Search ........................... 179/84 T, 84 SS

[56] References Cited

U.S. PATENT DOCUMENTS

| | | | |
|---|---|---|---|
| 2,808,463 | 10/1957 | Jenkins et al. | 179/84 T |
| 3,508,012 | 4/1970 | Golembeski et al. | 179/84 T |
| 3,603,740 | 9/1971 | Cambridge | 179/84 T X |
| 3,808,379 | 4/1974 | Lind | 179/84 T |

*Primary Examiner*—A. D. Pellinen
*Assistant Examiner*—W. J. Brady
*Attorney, Agent, or Firm*—Karl F. Ross

[57] ABSTRACT

A generator of ringing signals at a subscriber station of a telecommunication system, designed to respond to electromechanically generated lower-frequency call signals of large amplitude as well as to electronically generated higher-frequency call signals of small amplitude emanating from a central office, comprises a signal identifier and a level discriminator connected in parallel to an incoming line. The signal identifier includes a local oscillator emitting a train of pulses at a cadence substantially higher than any call-signal frequency which, in the presence of an incoming signal, are fed to a pulse counter during alternate half-cycles of a square wave derived from that signal. The value registered in any of such half-cycle by the counter is digitally transmitted to two circuit branches each comprising a further pulse counter adapted to receive the same square wave if the digital value read out from the first counter indicates a call-signal frequency in a predetermined range which is different for the two branches. Only one branch is enabled at any time, depending on the signal amplitude detected by the level discriminator. The counter in the enabled branch emits an activating pulse, after a certain number of square-wave cycles, to a ringing circuit which converts the locally generated pulse train into an intermittent audio-frequency oscillation driving a ringer; the counter of the enabled branch is periodically reset by this circuit which thereby terminates its own operation if that counter does not send out another activating pulse.

8 Claims, 4 Drawing Figures

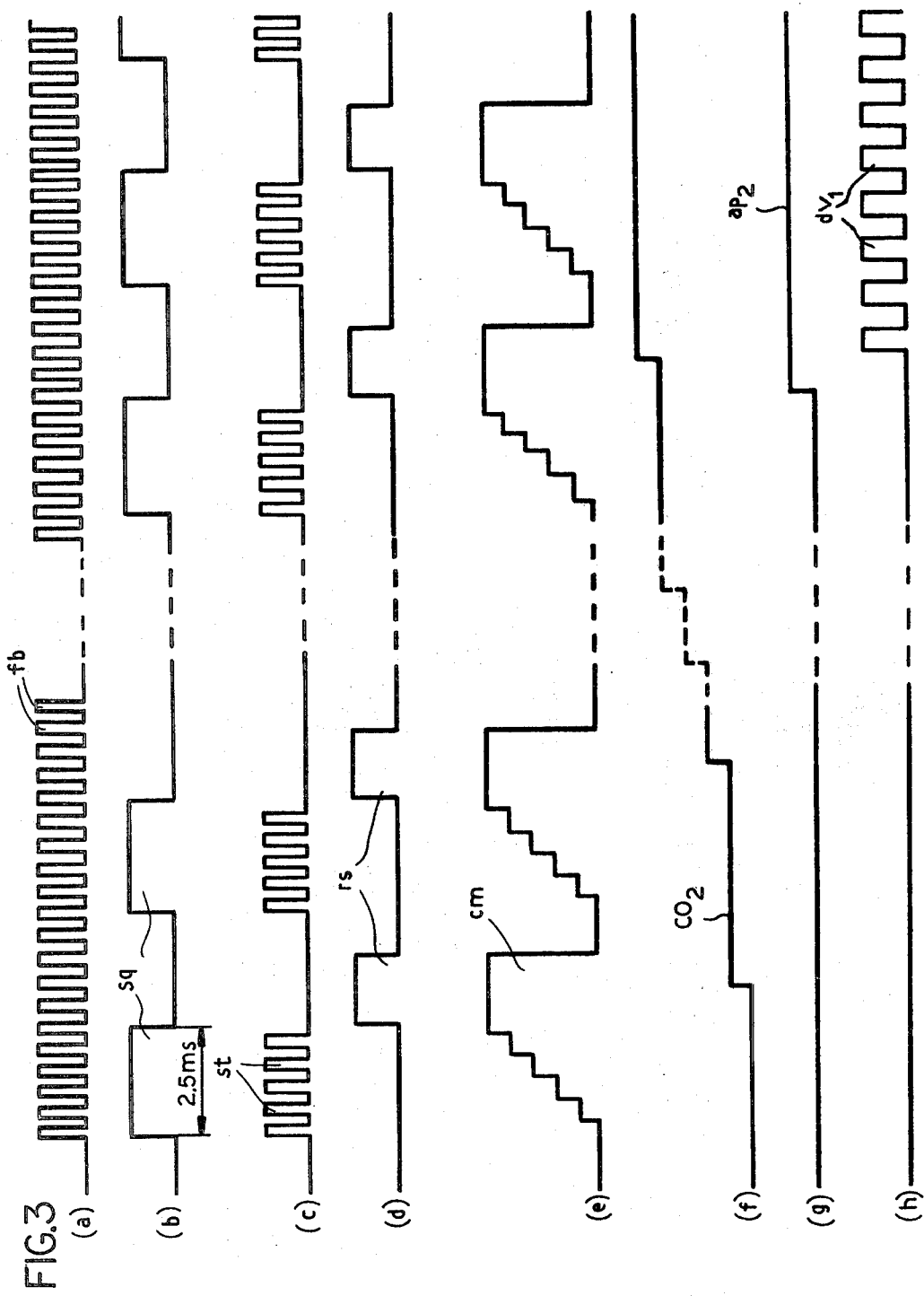

DIGITAL RINGING-SIGNAL GENERATOR

FIELD OF THE INVENTION

Our present invention relates to a generator of ringing signals for a station of a telephone or other telecommunication system equipped with an electroacoustic transducer designed to make audible an incoming call signal.

BACKGROUND OF THE INVENTION

While some telephone exchanges or central offices still operate with electromechanical call-signal generators, others use more recently developed electronic equipment for this purpose. The two types of call signal respectively emitted by electromechanical and electronic generators differ from each other in both amplitude and frequency. Thus, the electromechanically generated call signal lies in a low audio-frequency range, usually between 20 and 50 Hz, and is sent out with a high voltage level which may be on the order of 100 volts; the electronically generated call signal, on the other hand, lies in a higher audio-frequency range (e.g. between 400 and 500 Hz) and is emitted with an amplitude on the order of only a few volts.

Since a given subscriber station may have to be switched from one central office to another, or since an existing central office serving a large number of subscribers may change over in the course of modernization from electromechanical to electronic call-signal generation, it is desirable to equip subscriber stations with ringing-signal generators adapted to respond to either type of call signal.

Ringing circuits are known (e.g. from Italian patent application No. 19557-A/77) which check the frequency and the duration of incoming signals in order to determine the presence or absence of a call signal. We are not aware, however, of any such circuitry able to differentiate on the basis of amplitude and frequency between electromechanically and electronically generated call signals.

OBJECTS OF THE INVENTION

The principal object of our present invention, therefore, is to provide a ringing-signal generator adapted to recognize and respond to either type of incoming call signal in a dependable manner.

A more particular object is to provide means in such a signal generator for preventing a false response to voice signals occurring during a conversation between subscribers.

It is also an object of our invention to provide a signal generator for the purpose set forth which operates digitally and can thus be conveniently implemented with integrated circuitry.

A further object is to minimize the energy consumption of such a signal generator in the absence of an incoming call signal.

SUMMARY OF THE INVENTION

A ringing-signal generator according to our invention comprises input means receiving incoming audio-frequency signals from a line, first and second circuit branches connected in parallel to the input means for emitting a series of recognition pulses upon detecting incoming signals in a lower audio-frequency range assigned to electromechanically generated call signals or in a higher audio-frequency range assigned to electronically generated call signals, respectively, and level-discriminating means connected to the line for disabling the first circuit branch when there are no incoming signals above a predetermined amplitude threshold and for disabling the second circuit branch when such large-amplitude signals are present. The two circuit branches are connected to output means for converting either series of recognition pulses into an intermittent audio-frequency oscillation which is fed to the associated electroacoustic transducer for actuating same.

Pursuant to a more particular feature of our invention, the ringing-signal generator further comprises a local oscillator operable by the input means in the presence of an incoming signal to produce a train of reference pulses with a cadence or recurrence rate above the higher audio-frequency range assigned to electronically generated call signals, pulse-shaping means connected to the input means for converting an incoming periodic signal into a square wave, gating means with inputs connected to the local oscillator and to the pulse-shaping means for passing the reference pulses emitted by that oscillator only during alternate half-cycles of such a square wave, and pulse-counting means connected to the gating means for feeding to the two circuit branches a count of the number of reference pulses which have been passed during any of these alternate half-cycles. Since the pulse cadence is constant, their count during a half-cycle of a square wave derived from an incoming signal is a measure of the frequency of that signal. This count, therefore, need only be compared with a predetermined set of values by logical circuitry in each of the two branches for determining whether or not the signal frequency falls into one or the other of the aforementioned ranges. An even more specific determination can be readily made within such range to check if the signal has a frequency of, say, 20, 30 or 50 Hz as conventionally used in telephone exchanges with electromechanical call-signal generators.

Advantageously, a threshold circuit forming part of the input means enables the transmission of incoming signals to the pulse-shaping means only in the presence of a minimum line voltage. This insures that the signal generator is deactivated during conversation when the line voltage is generally lower than in the calling or ringing phase.

BRIEF DESCRIPTION OF THE DRAWING

The above and other features of our invention will now be described in detail with reference to the accompanying drawing in which:

FIG. 3 is a set of graphs relating to the operation of the signal identifier of FIG. 2.

SPECIFIC DESCRIPTION

Figure 1:
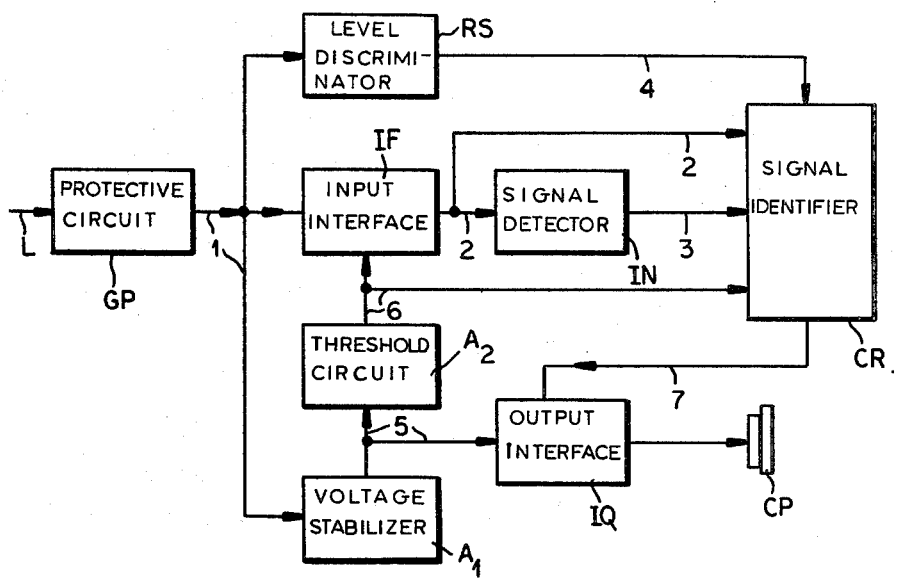
FIG. 1 is a block diagram of a ringing-circuit generator according to our invention.

As shown in FIG. 1, a line L emanating from a remote central office is connected at a subscriber station (whose conventional equipment coupled to that line has not been illustrated) to a protective circuit GP designed to guard against accidental polarity reversals. Circuit GT may comprise a simple rectifier or a diode bridge, for example, and passes incoming signals to a conductor 1 connected in parallel to a level discriminator RS, a voltage stabilizer $A_1$ and an input interface IF. An output lead 2 of interface IF extends directly to a signal identifier CR and in parallel therewith to a signal detector IN which also has an output lead 3 terminating at identifier CR. The latter further receives signals from level discriminator RS via a lead 4 and, by way of a lead 7, feeds an output interface IQ. Voltage stabilizer $A_1$ has an output lead 5 extending on the one hand to an enabling input of interface IQ and on the other hand to a threshold circuit $A_2$ from which a lead 6 extends to input interface IF as well as to signal identifier CR. An electroacoustic transducer CP, such as an encapsulated telephone ringer, is connected to the output of interface IQ.

When a call comes in from the associated central office by way of line L, that line is at an elevated d-c potential of a predetermined polarity passed by the guard circuit GP to voltage stabilizer $A_1$ which may be designed as a low-pass filter suppressing superimposed noise and signal currents. The relatively high voltage level on lead 5 (e.g. above 20 V) allows the interface IQ to transmit driving signals from the output lead 7 of identifier CR to transducer CP; it also causes threshold circuit $A_2$ to energize lead 6 with a somewhat lower d-c voltage of predetermined magnitude serving to activate components IF and CR. In contrast to circuit $A_1$, level discriminator RS responds only to a-c signals and may therefore comprise a blocking capacitor followed by a rectifier and a threshold comparator. Interface IF, when turned on by voltage on lead 6, passes only audio-frequency signals above a certain minimum amplitude, e.g. above 200 mV peak-to-peak; discriminator RS, on the other hand, may respond only to signals with a peak-to-peak amplitude of at least 60 V, for example. The signals clearing interface IF are detected by circuit IN, giving rise to an output voltage on lead 3. As noted above, the line voltage drops sharply when the called subscriber at the local station lifts his receiver off the hook to converse with the calling party; at that point, therefore, threshold circuit $A_2$ de-energizes its output lead 6 with resulting deactivation of interface IF and signal identifier CR. Any voltage subsequently appearing on lead 4 will be ineffectual as will become clear hereinafter.

Figure 2:
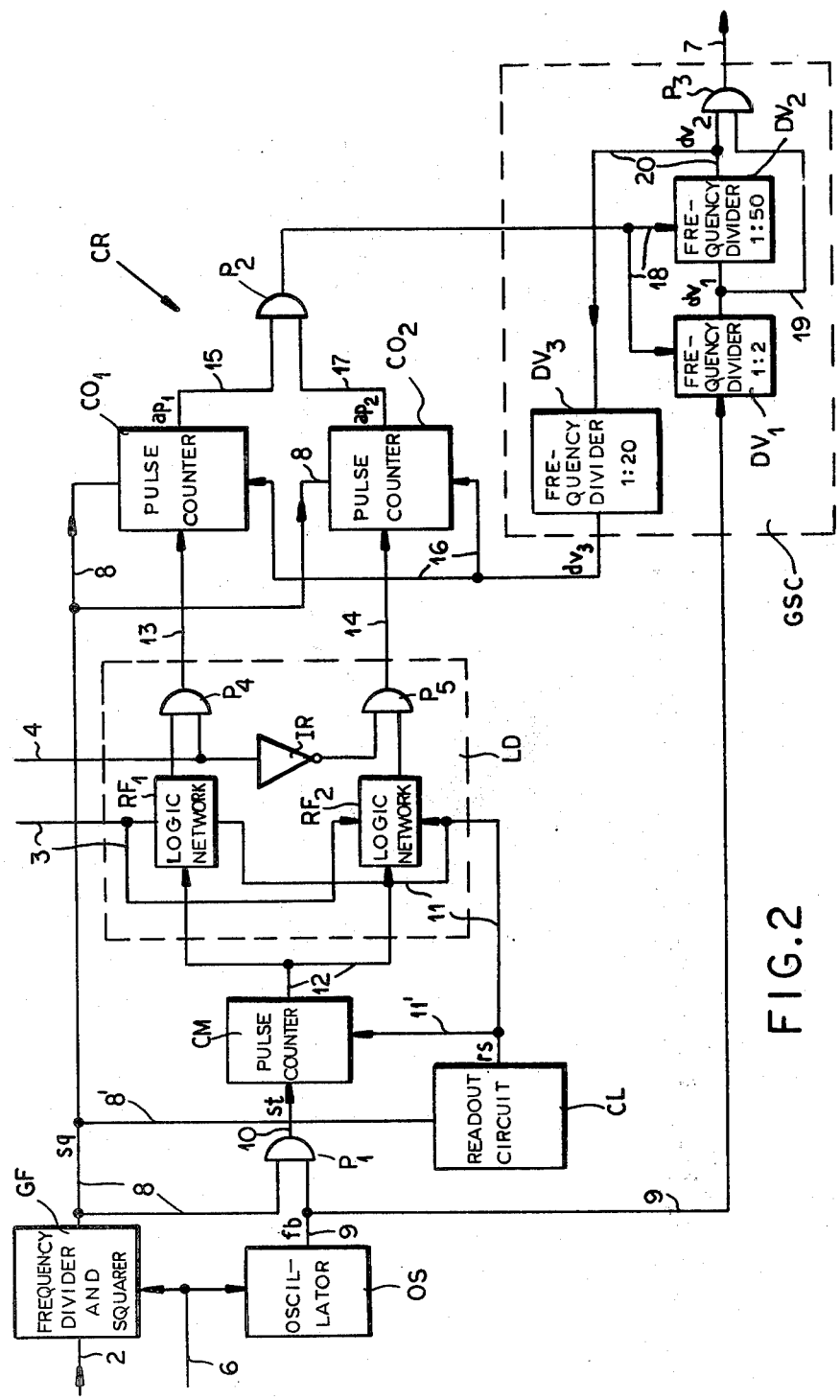
FIG. 2 is a more detailed circuit diagram of a signal identifier included in the generator of FIG. 1.

Details of signal identifier CR are shown in FIG. 2 according to which the incoming audio-frequency signals passed by interface IF (FIG. 1) are delivered via lead 2 to a frequency divider and squarer GF here assumed to have a step-down ratio of 1:2. An output lead 8 of circuit GF thus carries a square wave sq of half the frequency of an incoming periodic signal; this square wave has a 50% duty ratio so that each half-cycle thereof equals a full cycle of the incoming signal. A local oscillator OS, which like squarer GF is enabled by an activating voltage on lead 6, emits on an output lead 9 a train of reference pulses fb whose cadence is much higher than the highest electronically generated call-signal frequency. An AND gate $P_1$ has inputs tied to leads 8 and 9 so as to pass reference pulses fb only when signal sq is high, thereby feeding a series of stepping pulses st on a lead 10 to a pulse counter CM. Lead 8 also has a branch 8' extending to a readout circuit CL responsive to falling pulse flanks of square wave sq; circuit CL, which may comprise a monoflop triggered by such pulse flanks, then energizes an output lead 11 with a short pulse rs which reaches a resetting input of counter CM via a branch lead 11' and is fed as an activating signal to a pair of logic networks $RF_1$, $RF_2$ in a signal-recognition circuit LD. The trailing edge of that pulse resets the counter CM to zero.

Logic networks $RF_1$ and $RF_2$, which are unblocked when lead 3 is energized by the signal detector IN of FIG. 1, have inputs connected to an output multiple 12 of pulse counter CM and form part of two circuit branches further including respective AND gates $P_4$ and $P_5$ with output leads 13 and 14 extending to enabling inputs of respective further pulse counters $CO_1$ and $CO_2$. The output lead 4 of level discriminator RS (FIG. 1) is connected directly to a second input of gate $P_4$ and through an inverter IR to a second input of gate $P_5$. In the absence of high-level incoming signals triggering the discriminator RS, gate $P_4$ is nonconductive whereas gate $P_5$ conducts.

Counters $CO_1$ and $CO_2$ have stepping inputs connected in parallel to lead 8 so as to count the cycles of square wave sq from circuit GF. Output leads 15 and 17 carry activating pulses $ap_1$ and $ap_2$ from counters $CO_1$ and $CO_2$, upon respective enablement thereof, via an OR gate $P_2$ and a common lead 18 to a ringing circuit GSC comprising two cascaded frequency dividers $DV_1$ and $DV_2$ with enabling inputs connected to lead 18. Divider $DV_1$, whose input is connected to output lead 9 of oscillator OS, delivers a pulse train $dv_1$ of reduced cadence on a lead 19 to one input of an AND gate $P_3$ and in parallel therewith to divider $DV_2$ which supplies a pulse train $dv_2$ of still lower cadence on a lead 20 to a second input of gate $P_3$ as well as to a third divider $DV_3$. The latter, which simply operates as a pulse counter, emits on a lead 16 a pulse $dv_3$ to resetting inputs of counters $CO_1$ and $CO_2$ after a predetermined number of cycles of pulse train $dv_2$. Gates $P_3$ sends out driving pulses to the ringer CP of FIG. 1 by way of lead 7 and an output interface IQ.

We shall now described the operation of the signal identifier CR with reference to FIG. 3 where graph (a) shiows the train of reference pulse fb emitted by oscillator OS as long as lead 6 is energized. Graph (b) shows the square wave sq appearing on lead 8; when the level of that square wave has the logical value "1," stepping pulses st appear on lead 10 as shown in graph (c). Counter CM, previously reset, is advanced thereby as indicated at cm in graph (e). When square wave sq goes back to logical "0," circuit CL is tripped to produce a pulse rs that is shown in graph (d) and has a duration less than the shortest half-cycle which square wave sq may have when derived from a high-frequency (i.e. an electronically generated) call signal. Pulse rs activates the logic networks $RF_1$ and $RF_2$, already unblocked by voltage on lead 3, to receive and temporarily store the final count of component CM appearing in digitally coded form on multiple 12. Counter CM is then reset by the trailing edge of pulse rs as likewise indicated in graph (e).

The mode of operation of the two circuit branches $RF_1$, $P_4$, $CO_1$ and $RF_2$, $P_5$, $CO_2$ is virtually identical, except that network $RF_1$ compares the received count with one or more permanently stored values denoting a lower audio-frequency range whereas circuit $RF_2$ does the same for a range of considerably higher frequencies. Thus, we have represented in FIG. 3 only the operation of the latter circuit branch with the asumption that electronically generated call signals are to lie in a range of 400 to 500 Hz.

If the incoming call signal is of 400 Hz, each half-cycle of square wave sq will have a duration of 2.5 ms (in view of the frequency-halving effect of squarer (GF) as indicated in graph (b) and will encompass five reference pulses fb whose cadence, by way of example, is 2 kHz. If the signal frequency were 500 Hz, only four reference pulses would occur during a half-cycle of the square wave. Network $RF_2$, therefore, checks whether the number of stepping pulses st received by counter CM equals either four or five, i.e. whether the second and the third stage of this counter are respectively reset (logical "0") and set (logical "1"). When this is the case, and when lead 4 is de-energized owing to the absence of a voltage level associated with electromechanical signal generation, gate $P_5$ conducts and steps the pulse counter $CO_2$ whose advance in successive cycles of square wave sq is shown at $co_2$ in graph (f). When the counter has reached its full capacity, it emits on lead 17 an activating pulse $ap_2$ as shown in graph (g). Dividers $DV_1$ and $DV_2$, turned on by this pulse, then step down the pulse train fb on lead 9; graph (h) shows pulses $dv_1$ which in the present instance have a cadence of 1 kHz corresponding to a step-down ratio of 1:2 for divider $DV_1$. Divider $DV_2$ is assumed to have a step-down ratio of 1:50 so that its output pulses $dv_2$ have a cadence of 20 Hz. Thus, short bursts of 1-kHz pulses, lasting for 25 ms and separated by intervals of like duration, will appear on the output lead 7 of gate $P_3$ in conformity with ringing-tone specifications valid in Italy, for example. Divider $DV_3$ counts 20 pulses $dv_2$, spanning an interval of one second, and thereupon emits a pulse $dv_3$ which resets the counter $CO_2$.

The incoming call signal may be modulated at the central office at, say, 0.5 Hz so as to be interrupted after one second and recur one second later. If the called subscriber has not responded to the first ring, a second ring will then be generated in the aforedescribed manner and so on until the subscriber lifts his receiver or the remote caller hangs up.

If the incoming call signal is of the electromechanically generated type, its frequency is assumed to lie in a range of 20–50 Hz corresponding to a duration of 20–50 ms for each half-cycle of the resulting square wave sq. This, in turn, means a count of 40 to 100 stepping pulses st on the output lead 10 of gate $P_1$. If only signals of 20–30 Hz and of 50 Hz were to be considered, logic circuit $RF_1$ would have to reject any count below 66 or above 100 with the exception of 39, 40 or 41, for example. When the count has an admissible value, gate $P_4$ will conduct if the signal level is sufficient to energize lead 4 in the output of discriminator RS. An activating pulse $ap_1$ will then be emitted by counter $CO_1$ after a certain number of steps which, however, ought to be substantially less than the number of steps required by counter $CO_2$ to emit a pulse $ap_2$ in the presence of an electronically generated call signal. Thus, for example, the capacity of counter $CO_1$ may be one-tenth that of counter $CO_2$. The operation of ringing circuit GSC in response to pulse $ap_1$ will be the same as that described for pulse $ap_2$.

The two counters $CO_1$ and $CO_2$ could be replaced by a single counter, with a stepping input connected through an OR gate to leads 13 and 14, whose counting capacity may be adjusted under the control of voltage on lead 4 between a low value upon conduction of gate $P_4$ and a high value upon conduction of gate $P_5$.

From the foregoing description it will be apparent that the probability of untimely operation of signal identifier CR by noise on the line L is very small, owing to the frequency-selective character of logic circuit LD and the need for several recurrences of the same signal frequency in order to step the counter $CO_1$ or $CO_2$ a predetermined number of times. The operation of level discriminator RS also plays an important part, especially where the noise may come from nearby equipment driven by house current with a mains frequency (e.g. of 50 Hz in the example given above) corresponding to that of a possible call signal. It is highly unlikely that such a noise will surpass for a sustained period the threshold of level discriminator RS given by way of example as 60 V peak-to-peak. Other noises, such as dial pulses from adjacent telephones occurring at a rate of about 10 Hz, are readily filtered out by circuit LD.

Figure 4:
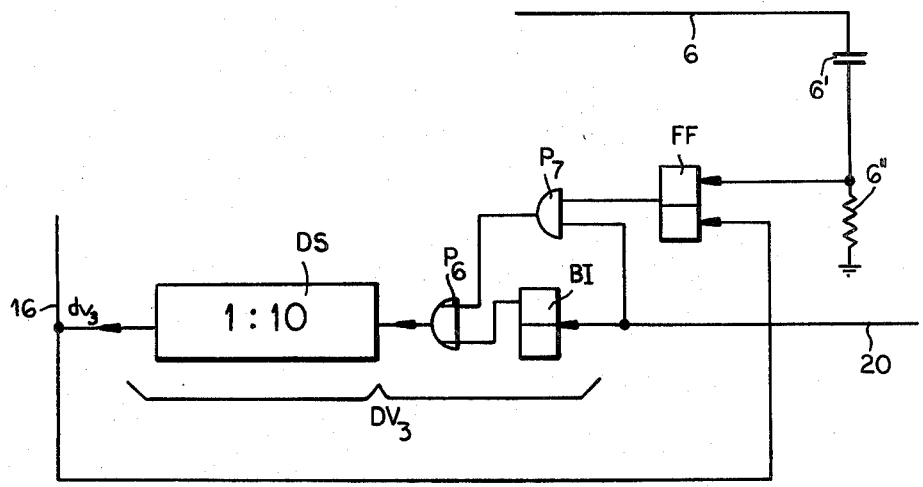
FIG. 4 is a circuit diagram showing a modification of a component of that signal identifier.

If, nevertheless, a noise similar to a call signal were to actuate the ringing circuit GSC, such actuation would in all probability occur only once and not in a periodic sequence. In order to minimize the risk that the local subscriber should misinterpret a fortuitous operation of transducer CP as an actual ring, we may modify the ringing circuit GSC in a manner causing a significant foreshortening of the first ring in the case of an incoming call. This can be done by short-circuiting one or more stages of frequency divider $DV_3$, as illustrated in FIG. 4 which shows divider $DV_3$ split into a binary input stage BI working through an OR gate $P_6$ into a divider section DS of step-down ratio 1:10. Input lead 20 of divider $DV_3$ is shown to have a branch extending to an AND gate $P_7$ which also has an input connected to a set output of a flip-flop FF; the output of this AND gate is connected to another input of OR gate $P_6$. Lead 6, energized during the ringing phase of an incoming call as discussed above, is connected to a setting input of flip-flop FF through a differentiator, comprising a series capacitor 6' and a grounded shunt resistor 6", which sets the flip-flop only at the instant of energization of that lead. Output lead 16 of divider $DV_3$ has a branch connected to a resetting input of flip-flop FF which therefore cuts off the gate $P_7$ after the first ring; no further setting of the flip-flop occurs until lead 6 is re-energized on a new incoming call. With stage BI short-circuited during conduction of that gate, the resetting pulse $dv_3$ on lead 16 appears already after 10 cycles of pulse train $DV_2$, i.e. after half a second.

It will be obvious that the intermittent oscillation delivered by circuit GSC to interface IQ can be adapted to existing ringing-tone requirements by changing the step-down ratios of dividers $DV_1$–$DV_3$ or replacing them with a different set of digital dividers or pulse counters. The pulse counts to be detected in networks $RF_1$ and $RF_2$ can, of course, also differ from those given above by way of example. While the counting capacities of components $CO_1$ and $CO_2$ may be freely selected, it is desirable to provide counter $CO_2$ with a relatively high capacity (as discussed above) since the frequencies of electronically generated call signals lie within the speech band and should therefore be verified as accurately as possible.

The signal identifier CR of FIG. 2, with or without the modification shown in FIG. 4, can be readily realized in integrated circuitry.

We claim:

1. In a station of a telecommunication system equipped with an electroacoustic transducer for the emission of audible ringing signals in response to electromechanically and electronically generated call signals incoming over a line, the electromechanically generated call signals being oscillations of relatively high amplitude in a lower audio-frequency range, the electronically generated call signals being oscillations of relatively low amplitude in a higher audio-frequency range, the combination therewith of a ringing-signal generator responsive to both types of call signal comprising:

input means connected to said line for receiving incoming audio-frequency signals therefrom;

a first circuit branch connected to said input means for emitting a first series of recognition pulses upon detecting incoming signals in said lower audio-frequency range;

a second circuit branch connected in parallel with said first circuit branch to said input means for emitting a second series of recognition pulses upon detecting incoming signals in said higher audio-frequency range;

level-discriminating means connected to said line for disabling said first circuit branch in the absence of incoming signals above a predetermined amplitude threshold and for disabling said second circuit branch in the presence of incoming signals above said amplitude threshold; and output means connected to said circuit branches for converting either of said series of recognition pulses into an intermittent audio-frequency oscillation fed to said transducer for actuating same.

2. The combination defined in claim 1 wherein said ringing-signal generator further comprises a local oscillator operable by said input means in the presence of an incoming signal to produce a train of reference pulses with a cadence above said higher audio-frequency range, pulse-shaping means connected to said input means for converting an incoming periodic signal into a square wave, gating means with inputs connected to said local oscillator and to said pulse-shaping means for passing said reference pulses only during alternate half-cycles of a square wave derived from an incoming signal, and pulse-counting means connected to said gating means for feeding to said circuit branches a count of the number of reference pulses passed during any of said alternate half-cycles, each of said branch circuits including logical circuitry for comparing said count with a predetermined set of values to emit a recognition pulse when the incoming signal falls in the respective frequency range.

3. The combination defined in claim 2 wherein each of said circuit branches is provided with an individual pulse counter connected to said logical circuitry thereof for delivering an enabling signal to said output means upon the number of said recognition pulses reaching a predetermined count.

4. The combination defined in claim 3 wherein said first and second circuit branches respectively include a first and a second logic gate inserted between said logical circuitry and said individual pulse counter thereof with inputs connected to said level-discriminating means for blocking the transmission of recognition pulses through said first logic gate in the presence and through said second logic gate in the absence of incoming signals above said amplitude threshold.

5. The combination defined in claim 2, 3 or 4 wherein said input means comprises a threshold circuit enabling the transmission of incoming signals to said pulse-shaping means only in the presence of a predetermined minimum line voltage.

6. The combination defined in claim 1, 2, 3 or 4 wherein said input means comprises a protective circuit passing incoming audio-frequency signals with a predetermined polarity only.

7. The combination defined in claim 3 or 4 wherein said output means comprises a plurality of cascaded frequency-divider stages, the last of said stages having an output connection to a resetting input of said individual pulse counter of each of said circuit branches.

8. The combination defined in claim 7 wherein said output means further comprises switchover means responsive to a first enabling signal for accelerating the first resetting of the individual pulse counter emitting said enabling signal, said switchover means being nonresponsive to subsequent recurrences of said enabling signal in the course of an incoming call.

* * * * *